Nov. 26, 1935.     J. K. CLONTZ     2,022,586
QUICK TRIP DRY PIPE VALVE
Filed July 24, 1934
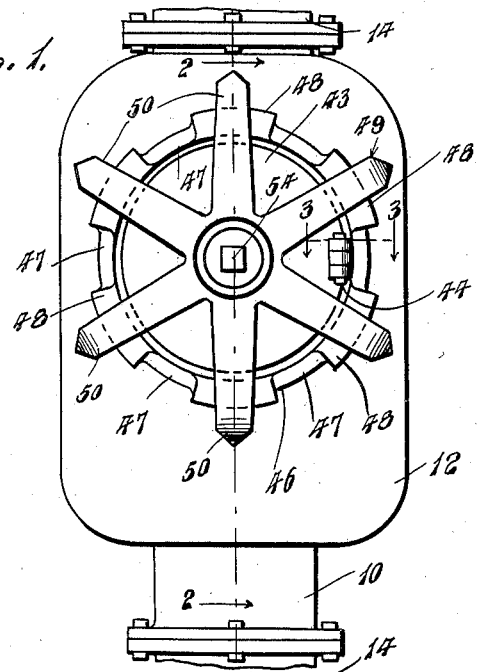
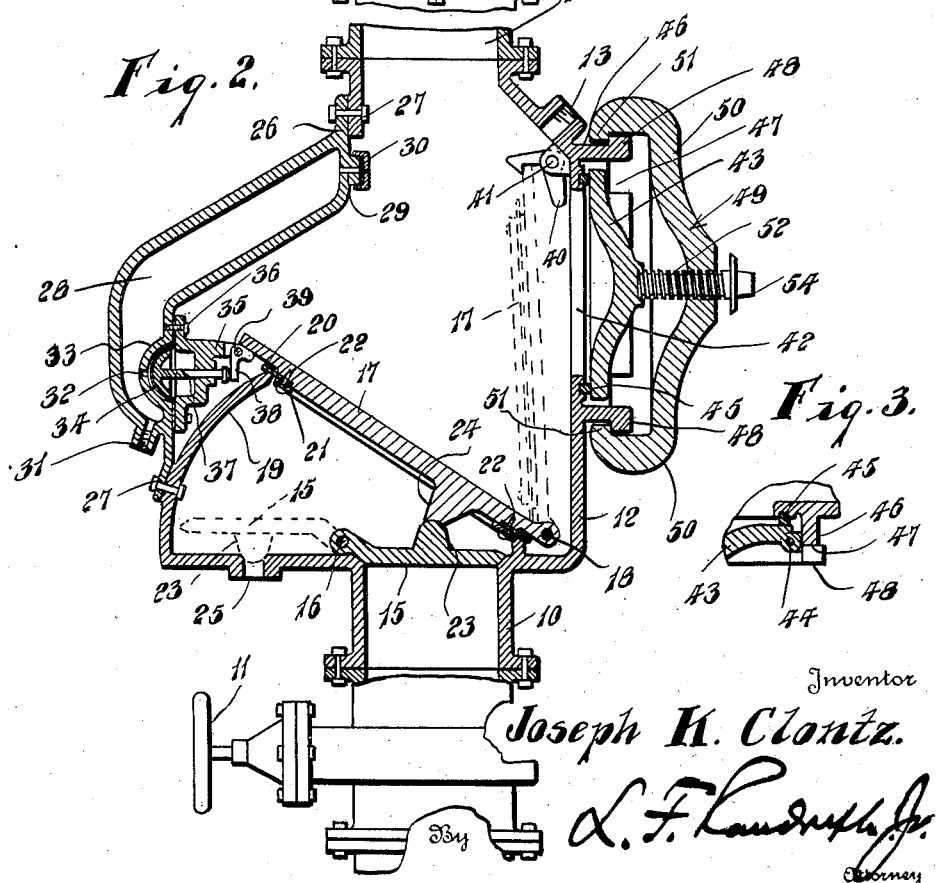
Inventor
Joseph K. Clontz.

Patented Nov. 26, 1935

2,022,586

UNITED STATES PATENT OFFICE 2,022,586

QUICK-TRIP DRY PIPE VALVE

Joseph K. Clontz, Winston-Salem, N. C.

Application July 24, 1934, Serial No. 736,767

4 Claims. (Cl. 169—22)

This invention relates to a quick-trip dry pipe valve for use in fire extinguishing systems employing a dry pipe.

It is primarily aimed to provide a novel construction wherein a differential in pressure is used to aid in unseating the main valve.

Still further it is aimed to provide a construction wherein the normally open drain below the main valve will be closed by the water disk in the open position of the latter.

The more specific objects and advantages will become apparent from a consideration of the description following taken in connection with the accompanying drawing illustrating an operative embodiment.

In said drawing:—

Figure 1 is a side elevation through the improved construction,

Figure 2 is a vertical sectional view taken on the line 2—2 of Figure 1, and

Figure 3 is a detail sectional view taken on the line 3—3 of Figure 1.

Referring specifically to the drawing, 10 designates a water pipe adapted for communication with a main, under control of a cut-off valve 11. Water pipe 10 leads to a chamber or casing 12 constantly subject to compressed air supplied through an inlet 13 from any suitable source. The top of the chamber 12 communicates with a conventional dry pipe 14.

A disk 15 normally closes the upper end of the water pipe 10, such disk being pivoted at 16 to the bottom wall of the casing 12. Angularly disposed with respect to the disk 15, within the casing 12, is a main valve 17, pivoted to the casing at 18. The bottom wall of casing 18 has an endless wall 19 rising therefrom and forming a seat for the valve 17, being directly engaged by a gasket 20 on such valve, held in place by a ring 21 and screws 22 or the equivalent. The disk 15 and valve 17 have lugs 23 and 24 which contact in the closed position of such parts in order that the valve will urge and maintain the disk seated. The bottom wall of casing 12 preferably has a drain opening 25 therein.

Said casing 12 has a removable wall section 26 bolted in place as at 27, and which is preferably hollow to provide an auxiliary low pressure air chamber 28 into which air passes from the chamber or interior of casing 12 through a port 29 through a screen or other filtering device as at 30. Drainage may occur from the chamber 28 through an outlet 31, with which a valve or other means may communicate as desired. The air in chamber 28 is adapted to escape through a port 32 in a bulged portion 33 of wall 26 in which a flexible diaphragm 34 is disposed and marginally sealed against the wall 26 by a bracket 35 and bolts 36. Contacting with the diaphragm 34 and slidable through the bracket 35 is a plunger 37 which is in contact with a bell crank lever 38 pivoted at 39 to the bracket and having one arm in contact with the valve 17.

As a result of the construction described, upon a differential in pressure between that in the main chamber of casing 12 and in the chamber 28, the pressure within the chamber 28 will act against the diaphragm 34 through port 32, accordingly sliding the plunger 37 and causing the plunger to move the lever 38 and give an initial thrust to the valve 17, which is inclined, and at the point diametrically opposite to the axis, so that the force of the water rising through pipe 10 will more readily open the disk 15, augmented through the engagement of the lugs 23 and 24, the disk 15 moving through the position shown in dotted lines in Figure 2 with the lug 23 entering the port 25 and closing the same. The main valve 17, however, moves through the dotted line position of Figure 2, automatically engaging the detent 40, pivoted at 41 to the casing 12.

The casing 12 is preferably provided with a port or opening at 42 closed water-tight by a door 43, preferably generally round and pivoted to the casing on a vertical axis as at 44. The casing is constructed to mount a gasket 45 about the opening 42 and the door seats against said gasket. In addition, a rim 46 extends integrally and outwardly from the casing 12, having alternate notches and outwardly extending lugs 47 and 48, respectively. A spider 49 is used to clamp the door 43 in place and it may have any desired number of arms 50 provided with terminal inwardly extending hooks 51. The spider 49 is applicable or removable by passing the hooks 51 through the notches 47 and then turning the same to engage the lugs 48 or to disengage such lugs. A screw stud 52 is threaded to the spider and bears against the door 43, a wrench head 54 preferably being provided on the screw.

Various changes may be resorted to provided they fall within the spirit and scope of the invention.

I claim as my invention:—

1. A device of the class described having a casing, said casing having a main pressure chamber and an auxiliary pressure chamber in communication through a restricted port, a main valve to control the supply of water subject to the pressure in the main chamber, means operable by a preponderance of pressure in the auxiliary chamber to impart an initial opening movement to said valve, said valve being inclined, said casing having a chamber below said main valve provided with an opening in communication with the atmosphere, and a water control disk pivoted below said main valve and normally maintained closed thereby, said disk in its open position being adapted to cover the said opening.

2. A device of the class described having a casing, said casing having a main pressure chamber and an auxiliary pressure chamber in communication through a restricted port, a main valve to control the supply of water subject to the pressure in the main chamber, means operable by a preponderance of pressure in the auxiliary chamber to impart an initial opening movement to said valve, said valve being inclined, a water control disk pivoted below said main valve and normally maintained closed thereby, said casing having a chamber below said main valve provided with a drain opening in communication with the atmosphere, said disk having a projection normally in engagement with the main valve, and said projection in the open position of the disk engaging said opening to close the same.

3. A device of the class described having a casing provided with an initially separate section, said casing having a main pressure chamber, said section containing an auxiliary pressure chamber in communication with the main pressure chamber through a restricted port, said casing having an upwardly and inwardly extending wall to which said section is fastened, a main valve to control the supply of water subject to the pressure in the main chamber contacting with the upper edge of said wall, and means between said wall and section operable by a preponderance of pressure in the auxiliary chamber to impart an initial opening movement to said valve comprising a diaphragm, on said section, a plunger rectilineally movable at an angle to said valve on said section operable by said diaphragm, and a trip element on said section operable by the plunger and directly engageable with the main valve.

4. A device of the class described having a casing provided with an initially separate section, said casing having a main pressure chamber, said section containing an auxiliary pressure chamber in communication with the main pressure chamber through a restricted port, a main valve to control the supply of water subject to the pressure in the main chamber, and means operable by a preponderance of pressure in the auxiliary chamber to impart an initial opening movement to said valve comprising a bulged portion on said section provided with a port, a diaphragm over said bulged portion, a bracket on said section over said diaphragm secured to said section, a plunger disposed at an angle to said valve and rectilineally slidable in said bracket subject to the action of said diaphragm, and a bell crank lever pivoted to the bracket and engaging said plunger and said valve.

JOSEPH K. CLONTZ.